United States Patent Office 3,567,823
Patented Mar. 2, 1971

3,567,823
SILVER AMMONIA FLUORIDE SOLUTION AND
METHOD OF ITS USE
Reiichi Yamaga, 1–15, Tondayanagawa-cho, Takatsuki-shi, Osaka-fu, Japan, and Ichiro Yokomizo, 45, Shitiku-kami-honmachi, Kita-ku, Kyoto-shi, Kyoto-fu, Japan
Filed June 5, 1968, Ser. No. 734,668
Claims priority, application Japan, June 9, 1967,
42/36,864
Int. Cl. A61k 5/00
U.S. Cl. 424—132                                9 Claims

ABSTRACT OF THE DISCLOSURE

A stable aqueous solution of silver ammonia fluoride which is prepared by dissolving silver fluoride in an aqueous ammonia or introducing gaseous ammonia into an aqueous solution of silver fluoride and adjusting the solution to pH 6.5~9.5. The silver ammonia fluoride solution can be effectively stabilized by addition of 1~2 w./v. percent of ammonium fluoride. The thus prepared solution is useful for prevention of dental diseases including caries and hypersensitivity. There is also disclosed a mouthpiece which comprises a horseshoe shaped body made of a spongy material saturated with a silver ammonia fluoride solution and a coating made of a water-impermeable material which covers the outer perimeter except for the surface being brought in contact with the affected part.

---

This invention relates to a silver ammonia fluoride solution. More particularly, it relates to a stable aqueous solution of silver ammonia fluoride for the dental uses. It relates also to methods of its preparation and of its use. Further, it relates to a mouthpiece for a dental purpose, which holds the said solution.

Hitherto, for the prevention of dental caries or the treatment of dentine hypersensitivity, there has been used silver nitrate or sodium fluoride. It is well known that silver and fluorine ions prevent the dental caries effectively. On the other hand, although the detailed mechanism of the dentine hypersensitivity has never been completely clarified, it is generally affirmed that silver nitrate and sodium fluoride have a certain effect on the hypersensitivity.

However, sodium fluoride reacts with hydroxyapotite, a main constituent of enamel and dentine, to dissociate phosphate anion ($PO_4^{---}$) as follows:

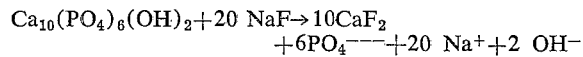

Likewise, application of silver nitrate causes a dissociation of calcium cation ($Ca^{++}$) from hydroxyapatite, the reaction being illustrated as follows:

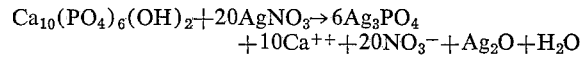

That is, both of those compounds cause an undesired erosion of tooth by dissociation of hydroxyapatite into $Ca^{++}$ or $PO_4^{---}$. As apparent from the above reaction scheme, if silver fluoride could be used for this purpose, silver cation and fluorine anion would be precipitated as silver phosphate and calcium fluoride, respectively. Thus, the erosion of teeth should be avoided. However, silver fluoride is extremely unstable, particularly in an aqueous solution, that it is easily decomposed to isolate silver. Further, a black precipitate of silver oxide is afforded by a reaction with hydroxyapatite. These serious defects prevent its clincial application.

As the results of the investigations of the present inventors, it has been discovered that silver fluoride reacts with ammonia to afford silver ammonia fluoride, $Ag(NH_3)_2F$, of which aqueous solution is remarkably stable. Moreover, it has also been confirmed by a diffraction of X-rays that the reaction of silver ammonia fluoride with hydroxyapatite proceeds as follows:

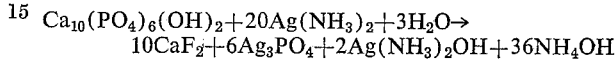

Both of calcium fluoride and silver phosphate are precipitated on the surface of teeth, and serve for protection and strengthening of teeth. The median lethal dose ($LD_{50}$ value) of silver ammonia fluoride is determined in mice to be 190 mg./kg. (as silver fluoride) orally. Since the $LD_{50}$ value of a popular agent, sodium fluoride, is 152 mg./kg. orally, the toxicity of silver ammonia fluoride is less than the said popular agent.

The present invention has been accomplished on the basis of these discoveries. Accordingly, a fundamental object of the invention is to provide a stable aqueous solution of silver ammonia fluoride for the prevention of dental diseases. Another object of the invention is to provide a method for preparing the said solution. A further object of the invention is to provide a method of prevention of the dental diseases. A still further object of the invention is to provide a mouthpiece holding the said solution which is useful for the above stated prevention. These and other objects of the present invention will become apparent to those conversant with the art from the following detailed disclosures.

According to the present invention, the silver ammonia fluoride solution can be prepared by introducing gaseous ammonia to an aqueous solution of silver fluoride, dissolving silver fluoride in an aqueous ammonia or admixing an aqueous solution of silver fluoride with an aqueous ammonia. Since ammonia fluoride has a marked stabilizing effect on silver ammonia fluoride in an aqueous solution, it is recommended to add 1~2 w./v. percent of ammonium fluoride to the objective solution of silver ammonia fluoride. It is also preferred to use a freshly prepared aqueous solution of silver fluoride for the intended preparation of the silver ammonia fluoride solution of a high purity, because highly purified silver fluoride is not usually available and it tends to be decomposed on preservation. For this purpose, a suitable silver compound, e.g. silver oxide or silver carbonate, is dissolved in a slightly excess amount of hydrofluoric acid to obtain a freshly prepared silver fluoride solution containing an excess hydrofluoric acid. Then, to the solution is introduced a gaseous ammonia or added an aqueous ammonia alternatively, the said silver compound may be made to react with a slightly excess amount of ammonium fluoride in water. Thus, there can be obtained the objective silver ammonia fluoride solution containing a small amount of ammonium fluoride as the stabilizer.

For the clinical application, the concentration of the solution is desired to be 25~35 w./v. percent as silver fluoride. This may be adjusted by using previously calculated amounts of the starting materials. Alternatively, there may be prepared a solution of a higher concentration, and diluted to the above defined concentration.

On the other hand, the preferred pH range of the objective solution is from 6.5~9.5. At a lower pH silver is apt to be isolated and precipitated, and at a higher pH, an unfavorable irritation against gum is caused and an ammoniac odor is emphasized.

The thus prepared silver ammonia fluoride solution is useful for the prevention of dental caries, the protective coating of dentine, and the treatment of various dental diseases such as hypersensitivity, apthous stomatitis, pyorrhea and a small bleeding. It is particularly advantageous in neither serious blackening nor erosion of teeth is encountered. For example, the treatment of dentine hypersensitivity can be carried out according to the following procedures: (1) the affected part is washed with 3 w./v. percent hydrogen peroxide solution; (2) the affected tooth is segregated with roll cottons; (3) the segregated tooth is dried with warm air; (4) the silver ammonia fluoride solution is applied to the affected tooth with a cotton pellet and left for 3~4 minutes; and (5) the segregating cottons are taken off and the mouth is rinsed out. This treatment is repeated 3~4 times at intervals of a few days. The clinical effect for 45 cases of the hypersensitivity was determined by tactile and thermal test, and the result is shown in the following table:

Table. Effect of Silver Ammonia Flouride on Hypersensitivity.

|  | Tactile test, percent | Thermal test, percent |
| --- | --- | --- |
| Excellent effect | 68.8 | 80.0 |
| Considerable effect | 8.8 | 6.6 |
| No effect | 22.2 | 13.3 |

As apparent from the table, the silver ammonium fluoride solution of the present invention is highly effective for the treatment of the hypersensitivity. The applications of the solution for the other purposes can be achieved in a similar manner to the above mentioned procedures.

In another aspect of the present invention, it relates also to a mouthpiece device holding the above described silver ammonia fluoride solution. More particularly, the invention relates to a mouthpiece device for the prevention of dental caries, and threatment of dental diseases, such as hypersensitivities, apthous stomatitis and pyorrhea, which comprises a horseshoe shaped body being made of a spongy material permeable to water and being saturated with a silver ammonia fluoride solution and a coating of the outer perimeter excluding at least either the top or bottom of the body, the said coating being impermeable to water. The said body may have in at least either the top or bottom a trough arranged and adapted to the patient's upper or lower teeth and gum.

Figure 1:
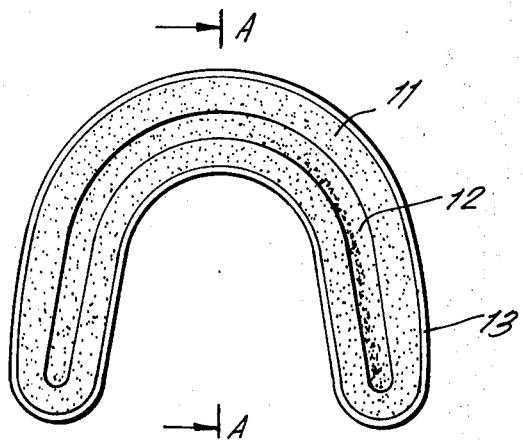
FIG. 1 is a plane view of a device constructed to embody the preferred teaching of the invention.
Figure 2:
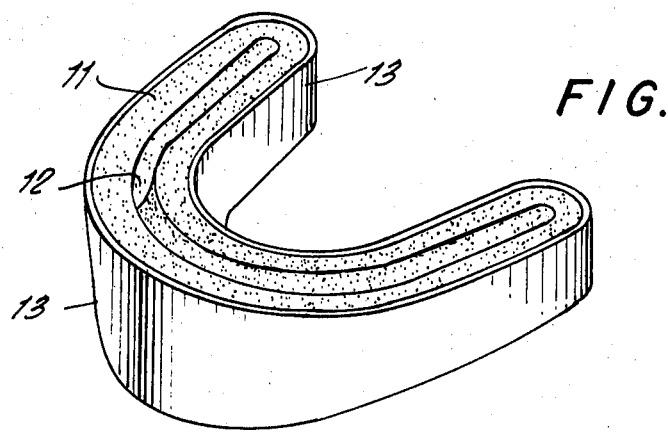
FIG. 2 is a perspective view of such device.
Figure 3:
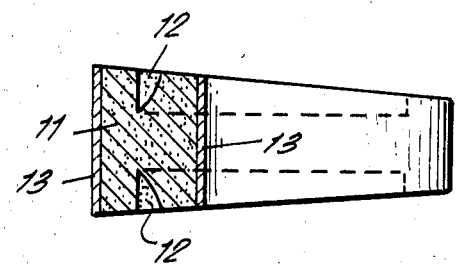
FIG. 3 is a vertical sectional view drawn on the line A—A of FIG. 1.

The mouthpiece of the present invention has a horseshoe shaped configuration so as to follow the alveolar processes of the patient. The body 11 is made of a spongy material being permeable to water so as to be saturated with a silver ammonia fluoride. Examples of such a spongy material include sponge, spongy gum and a plastic foam (e.g. polyurethane foam). In at least either the top or bottom of the body 11, there may be, but not necessarily, located a trough 12, which is arranged and adapted to the upper or lower teeth and gum of the patient so as to well invest the affected part. The outer perimeter excluding at least either the top or bottom which is intended to be brought in contact with the affected part is covered with a coating 13. The coating is made of a substance being impermeable to water so that the treating solution is well held in the body. As illustrative of the substance for the coating are paraffin, wax, paraffin paper, silicone and various plastic films. For the convenience of introduction of the mouthpiece into the patient's mouth, the thickness of the body may be made thinner from the front to the back. When the mouthpiece is applied, the treating solution is exuded to the affected teeth from the uncoated surface of the body by biting force exerted by the patient's jaws. Because the body is made of a spongy substance, the mouthpiece of the present invention can be easily brought in complete contact with the affected part of the patient without fine arrangement. Further, because the mouthpiece device has a more simplified structure than those ever known or used, it can be manufactured with unexpensive cost. Thus, it might be thrown away on each treatment so that troublesome sterilization is no longer necessary.

The following examples will illustrate the present invention more specifically. But, it is to be understood that they are presented for the purpose of illustration only and not of limitation. In the examples, percentages are set forth by weight per volume percentage. The abbreviations have conventional significances.

EXAMPLE 1

To 30% percent silver fluoride solution (100 ml.) is added ammonium fluoride (2 g.) and adjusted to pH 8.5 by introduction of gaseous ammonia under cooling. After removal of insoluble materials by filtration, the solution is filled and preserved in a light-resistant container.

EXAMPLE 2

To a solution of silver nitrate (53.5 g.) in water (30 ml.) is added another solution of anhydrous sodium carbonate (34 g.) in water (100 ml.) while stirring. Silver carbonate precipitated is collected by filtration, and washed twice with water (each 30 ml. portion). Thus prepared silver carbonate is added to 40% hydrofluoric acid (50 ml.), and the mixture is stirred for a while, whereby silver carbonate is dissolved out with generation of carbon dioxide. The resulting solution is diluted with distilled water (50 ml.), adjusted to pH 9.0 by introduction of gaseous ammonia and filtered to give the objective silver ammonia fluoride solution, of which concentration is 40% as silver fluoride. On application, this solution is diluted with water to 30% as silver fluoride.

EXAMPLE 3

To a solution of ammonium fluoride (14.8 g.) in water (80 ml.) is added silver oxide (22 g.), and the mixture is stirred at 50~60° C. until silver oxide is dissolved. The solution is adjusted to pH 8.5 by addition of aqueous ammonia, filtered, and diluted with water to 30% as silver fluoride.

What is claimed is:

1. A silver ammonia fluoride solution for the prevention and treatment of dental diseases which comprises substantially 25~35% (as silver fluoride) of silver ammonia fluoride and water, of which pH is adjusted to 6.5~9.5.

2. A silver ammonia fluoride solution for the prevention and treatment of dental diseases which comprises substantially 25~35% (as silver fluoride) of silver ammonia fluoride, 1~2% of ammonium fluoride and water, of which pH is adjusted to 6.5~9.5.

3. A process for preparing a silver ammonia fluoride solution which comprises substantially reacting silver fluoride with ammonia in aqueous medium.

4. The process claimed in claim 3, wherein freshly prepared silver fluoride is used without isolation.

5. The process claimed in claim 3, wherein the resulting solution is adjusted to pH 6.5~9.5.

6. A process for preparing a silver ammonia fluoride solution which comprises dissolving silver carbonate in a slightly excess amount of hydrofluoric acid and introducing ammonia so as to adjust the pH to 6.5~9.5.

7. A process for preparing a silver ammonia fluoride solution which comprises dissolving silver oxide in an aqueous solution of ammonium fluoride and introducing ammonia so as to adjust the pH to 6.5~9.5.

8. A method of preventing and treating dental caries which comprises applying a silver ammonia fluoride solution locally to teeth of which caries is intended to be prevented or treated.

9. A method of treating dental hypersensitivity which comprises applying a silver ammonia fluoride solution locally to the affected teeth.

No references cited.

RICHARD L. HUFF, Primary Examiner

U.S. Cl. X.R.

23—88; 128—260; 424—52